(12) United States Patent
Ishikawa et al.

(10) Patent No.: US 9,417,698 B2
(45) Date of Patent: Aug. 16, 2016

(54) INPUT DEVICE

(71) Applicant: ALPS ELECTRIC CO., LTD., Tokyo (JP)

(72) Inventors: Shinji Ishikawa, Miyagi-Ken (JP); Kazuhiko Hiratsuka, Tokyo (JP); Atsushi Masuda, Tokyo (JP); Shinji Fujimura, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 76 days.

(21) Appl. No.: 14/498,185

(22) Filed: Sep. 26, 2014

(65) Prior Publication Data

US 2015/0084898 A1    Mar. 26, 2015

(30) Foreign Application Priority Data

Sep. 26, 2013 (JP) .................................. 2013-199952
Mar. 17, 2014 (JP) .................................. 2014-053533

(51) Int. Cl.

| H01H 3/12 | (2006.01) |
| H01H 13/14 | (2006.01) |
| G06F 3/01 | (2006.01) |
| G06F 1/16 | (2006.01) |
| G06F 3/0354 | (2013.01) |

(52) U.S. Cl.
CPC .................. G06F 3/016 (2013.01); G06F 1/169 (2013.01); G06F 3/03547 (2013.01)

(58) Field of Classification Search
CPC ............. H01H 9/26; H01H 3/12; H01H 3/48; H01H 3/60; H01H 13/14; H01H 13/72; H01H 13/76; H01H 2221/062; H01H 1/00; H01H 1/06; H01H 3/00; H01H 3/02; H01H 3/08; H01H 3/54; H01H 13/00; H01H 13/22; H01H 13/26; H01H 13/50; H01H 2003/02; H01H 2003/12; H01H 2201/004; H01H 2205/00; H01H 2205/002; H01H 2205/004; H01H 2221/01; H01H 2223/01; H01H 2223/012; H01H 2223/028; H01H 2231/012; H01H 2231/016; H01H 9/00; H01H 19/02; H03K 17/962; H03K 17/975; H03K 2003/0293; H03K 2239/066; H03K 2217/94073

USPC ............ 200/5 A, 341, 534, 48 R, 48 P, 50.03, 200/440, 449, 453, 457, 459, 463, 467, 511, 200/520, 540, 572, 239, 248–250, 290, 293, 200/302.2, 318, 318.1, 321–324, 333, 345

See application file for complete search history.

(56) References Cited

U.S. PATENT DOCUMENTS

| 7,841,791 | B2 * | 11/2010 | Iso ........................ G06F 1/1616 400/472 |
| 8,264,465 | B2 | 9/2012 | Grant et al. |
| 2004/0251120 | A1 * | 12/2004 | Miyako .............. H01H 13/7065 200/517 |

*Primary Examiner* — Renee Luebke
*Assistant Examiner* — Anthony R. Jimenez
(74) *Attorney, Agent, or Firm* — Brinks Gilson & Lione

(57) ABSTRACT

An input device includes: an operation portion allowing an input operation by an operating body contacting with or coming close to an upper surface thereof; an input detection portion detecting an input operation with respect to the operation portion; a driving member provided below the operation portion and driving the operation portion in an up-down direction; an elastic member provided below the operation portion; a case member holding the driving member; an interlocking member provided below the operation portion, connected to the operation portion, and driven with the operation portion; a restricting member provided between the operation portion and the interlocking member and restricting upward movement of the interlocking member; and an elastic first damper member provided below the interlocking member and contactable with the interlocking member. The elastic member elastically urges the interlocking member such that the interlocking member is brought into press contact with the first damper member.

4 Claims, 16 Drawing Sheets

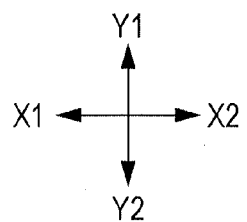
FIG. 9
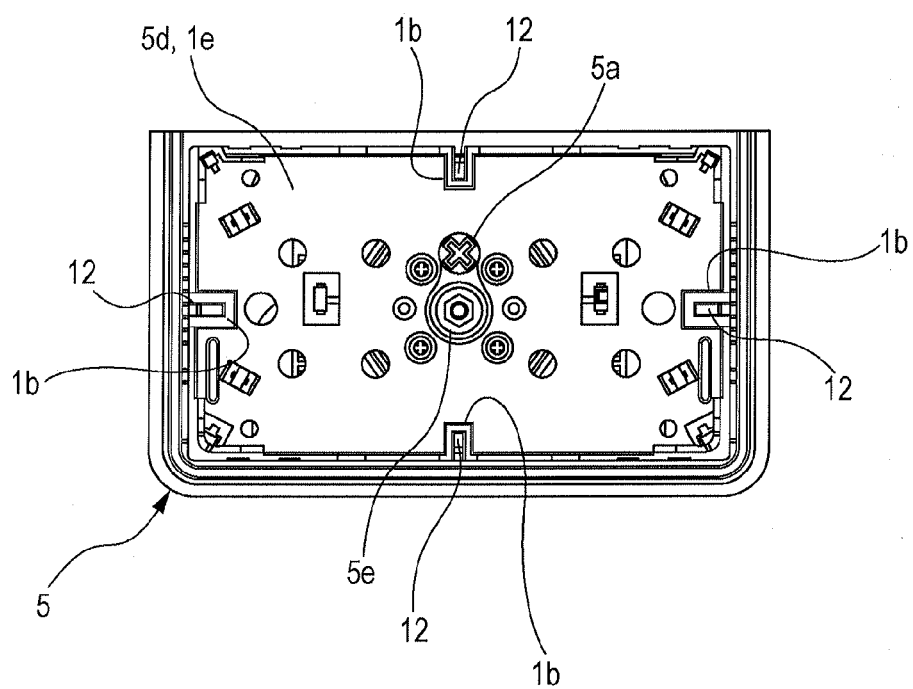

INPUT DEVICE

CLAIM OF PRIORITY

This application claims benefit of priority to Japanese Patent Application No. 2013-199952 filed on Sep. 26, 2013, and Japanese Patent Application No. 2014-053533 filed on Mar. 17, 2014, which are hereby incorporated by reference in its entirety.

BACKGROUND

1. Field of the Disclosure

The present disclosure relates to an input device, and particularly relates to an input device that is able to generate a sharp operation feeling.

2. Description of the Related Art

In recent years, input devices that allow an input operation to be performed by touching an operation surface and are able to provide an operation feeling to an operator by applying vibration to the operation surface have been increased in number. An input device described in PCT Japanese Translation Patent Publication No. 2008-516348 is known as such an input device.

The input device described in PCT Japanese Translation Patent Publication No. 2008-516348 will be described below with reference to FIG. 17. FIG. 17 is a side view showing the configuration of the input device 900 described in PCT Japanese Translation Patent Publication No. 2008-516348.

The input device 900 described in PCT Japanese Translation Patent Publication No. 2008-516348 includes a touchpad 916, a spring 952, and an actuator 954. The touchpad 916 is positioned on one or more springs 952 and held so as to be movable along a Z1-Z2 direction. In addition, the actuator 954 is connected to a lower side (Z2 direction side) of the touchpad 916 and is able to apply a force to the touchpad 916 to move the touchpad 916 along the Z1-Z2 direction. The actuator 954 is a linear voice coil actuator and is able to apply an impact by a short pulse or vibration having a specific desired frequency. As described above, it is possible to provide an operation feeling to the operator by the actuator 954 applying vibration or the like to the touchpad 916. The springs 952 return the touchpad 916 to a stationary position after the touchpad 916 moves up and down by a force from the actuator 954. In addition, the springs 952 are able to provide elastic springing to the touchpad 916 to increase a force outputted by the actuator 954.

Such an input device having a function to provide an operation feeling to the operator by vibration or the like is desired to provide a good operation feeling. A good operation feeling refers to a sharp feeling from which generation and end of vibration or the like are clearly felt. However, the input device 900 described in PCT Japanese Translation Patent Publication No. 2008-516348 has a structure in which the actuator 954 directly presses the touchpad 916, and has a structure in which the touchpad 916 is always pulled downward by the springs 952. Thus, when the touchpad 916 is moved downward (in a Z2 direction) after being moved upward (in a Z1 direction) along the Z1-Z2 direction by activation of the actuator 954, the speed at which the touchpad 916 changes from its upward movement to its downward movement is faster than the speed at which the actuator 954 changes from its upward movement to its downward movement. In other words, the actuator 954 hinders downward movement of the touchpad 916. Thus, it is difficult to clearly feel vibration, and the operation feeling worsens. In addition, the touchpad 916 is returned to the stationary position by the springs 952, but it takes time to terminate the vibration of the springs 952. Thus, the vibration is prolonged to make the operation feeling worse.

The present invention solves the above-described problem and provides an input device that is able to generate a sharp operation feeling.

SUMMARY

An input device according to an aspect of the present invention includes: an operation portion allowing an input operation to be performed by an operating body contacting with or coming close to an upper surface thereof; an input detection portion detecting an input operation with respect to the operation portion; a driving member provided below the operation portion and driving the operation portion in an up-down direction; an elastic member provided below the operation portion; a case member holding the driving member; an interlocking member provided below the operation portion, connected to the operation portion, and driven with the operation portion; a restricting member provided between the operation portion and the interlocking member and restricting upward movement of the interlocking member; and a first damper member provided below the interlocking member, contactable with the interlocking member, and having elasticity. The elastic member elastically urges the interlocking member such that the interlocking member is brought into press contact with the first damper member.

BRIEF DESCRIPTION OF THE DRAWINGS

FIG. 9 is a plan view showing a state where rotation prevention members and rotation prevention guide portions of the operation portion according to the first embodiment are engaged with each other;

DESCRIPTION OF THE EXEMPLARY EMBODIMENTS

An input device 100 according to a first embodiment will be described below.

Figure 1:
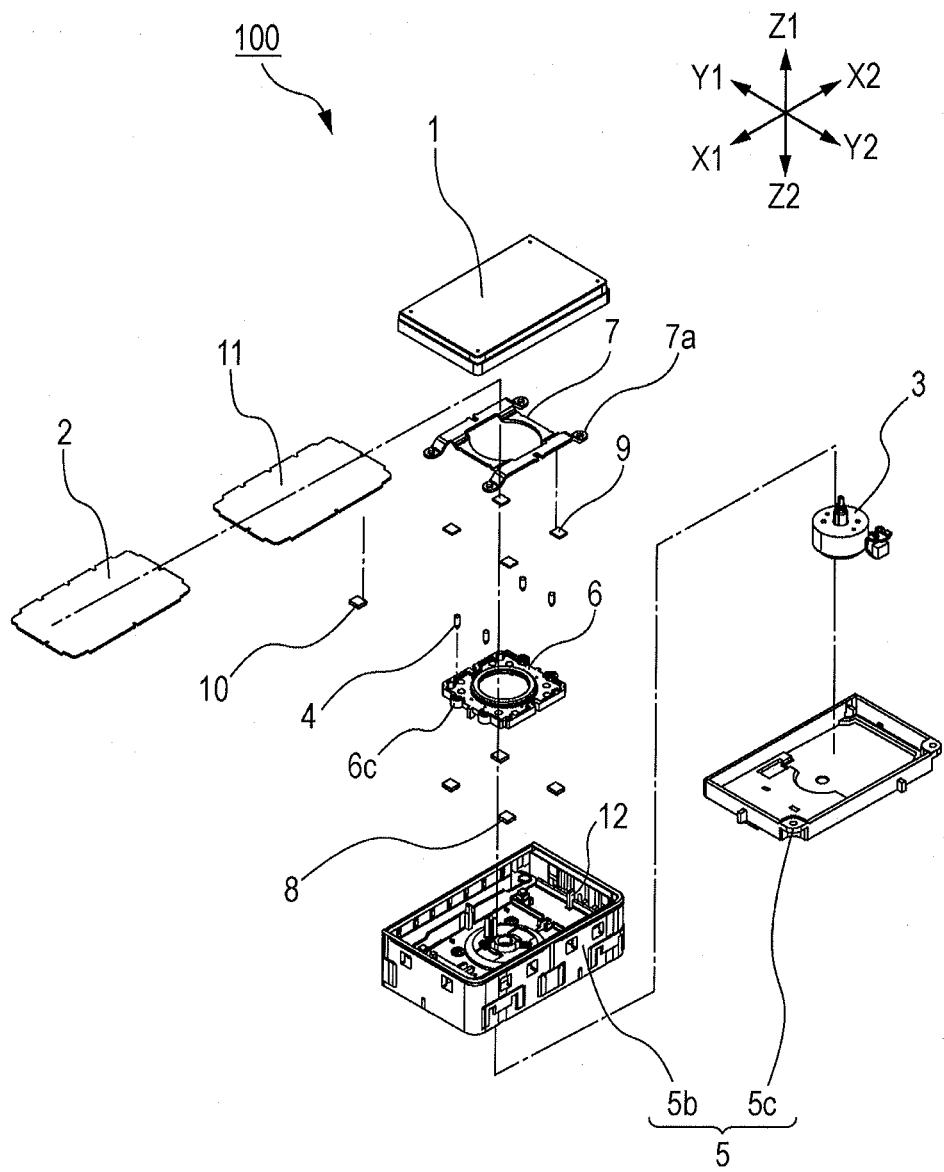
FIG. 1 is an exploded perspective view showing the configuration of an input device according to a first embodiment.
Figure 2:
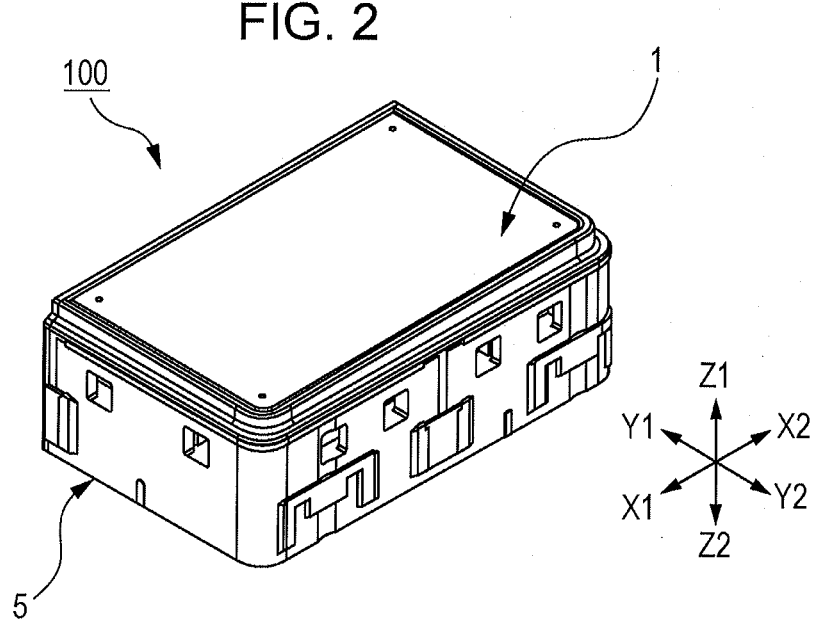
FIG. 2 is a perspective view showing the appearance of the input device according to the first embodiment.
Figure 3:
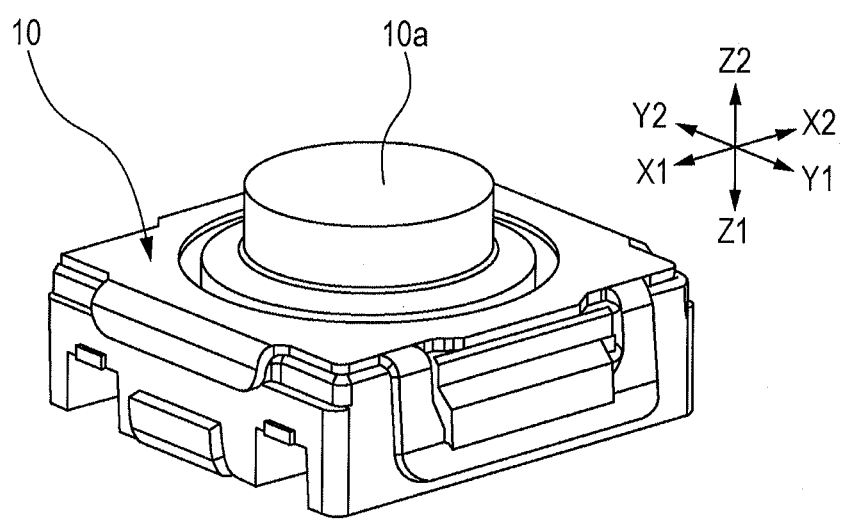
FIG. 3 is a perspective view showing the appearance of a pressing detection portion according to the first embodiment.
Figure 4A:
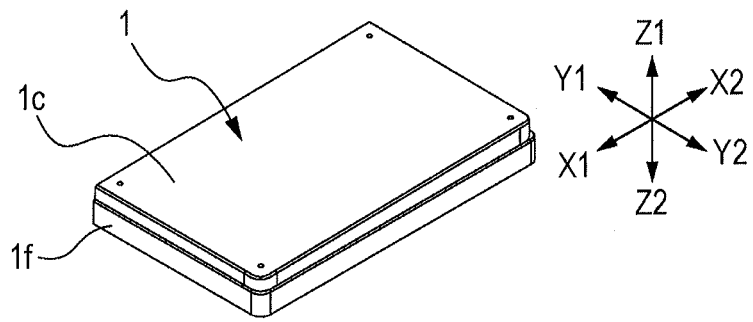
FIGS. 4A to 4C are diagrams showing an operation portion according to the first embodiment.
Figure 4B:
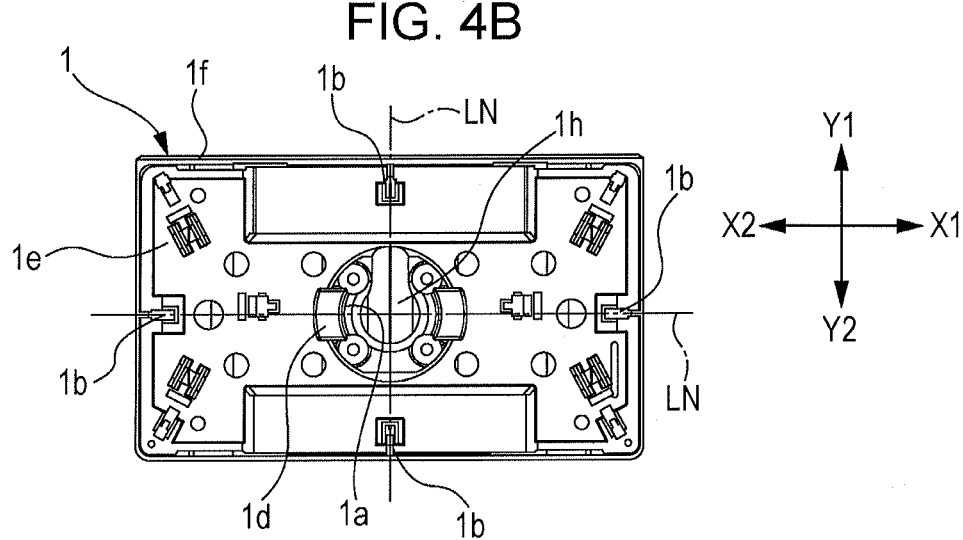
Figure 4C:
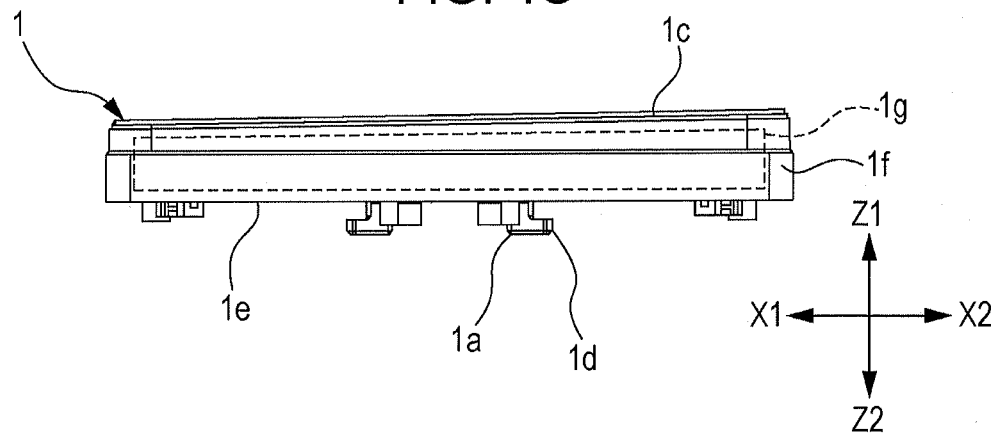
Figure 5A:
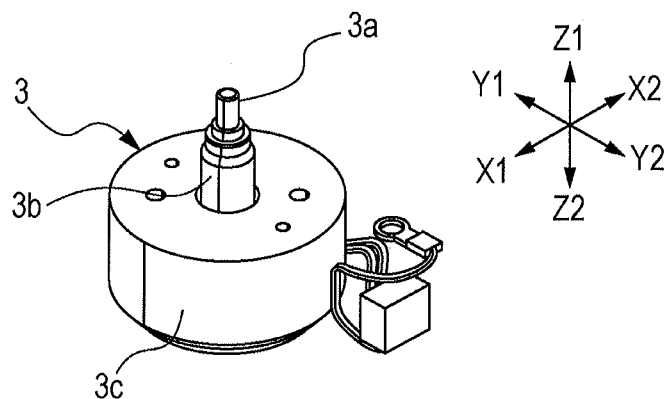
FIGS. 5A and 5B are diagrams showing a driving member according to the first embodiment.
Figure 5B:
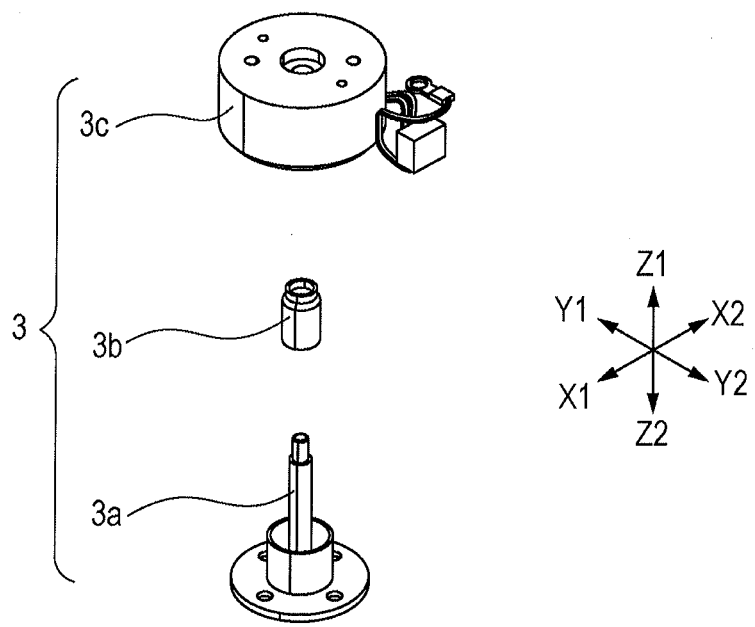
Figure 6:
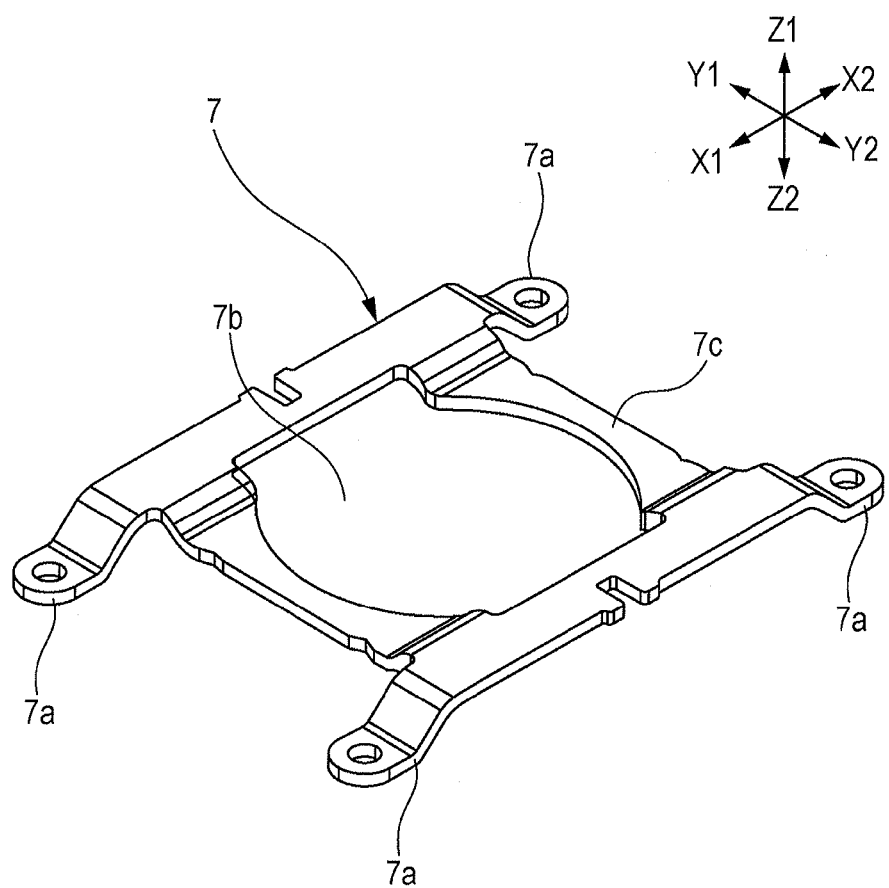
FIG. 6 is a perspective view showing the appearance of a restricting member according to the first embodiment.
Figure 7A:
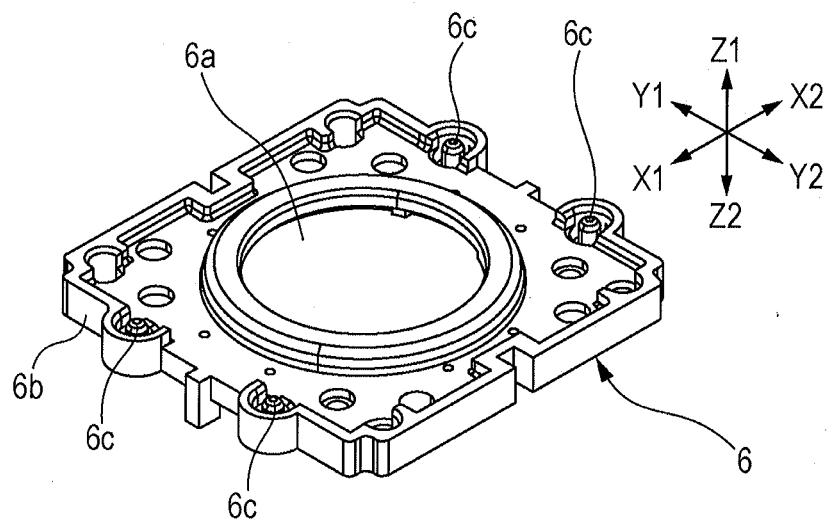
FIGS. 7A and 7B are diagrams showing an interlocking member according to the first embodiment.
Figure 7B:
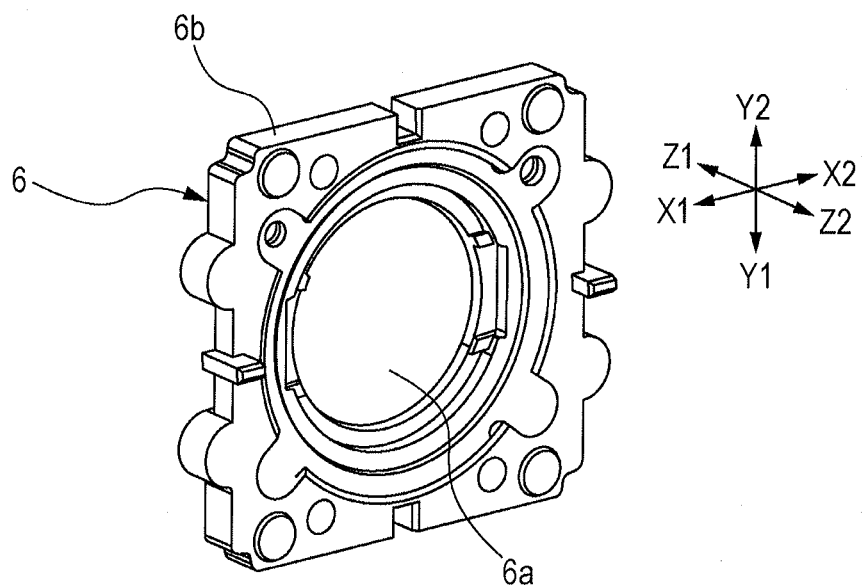
Figure 8A:
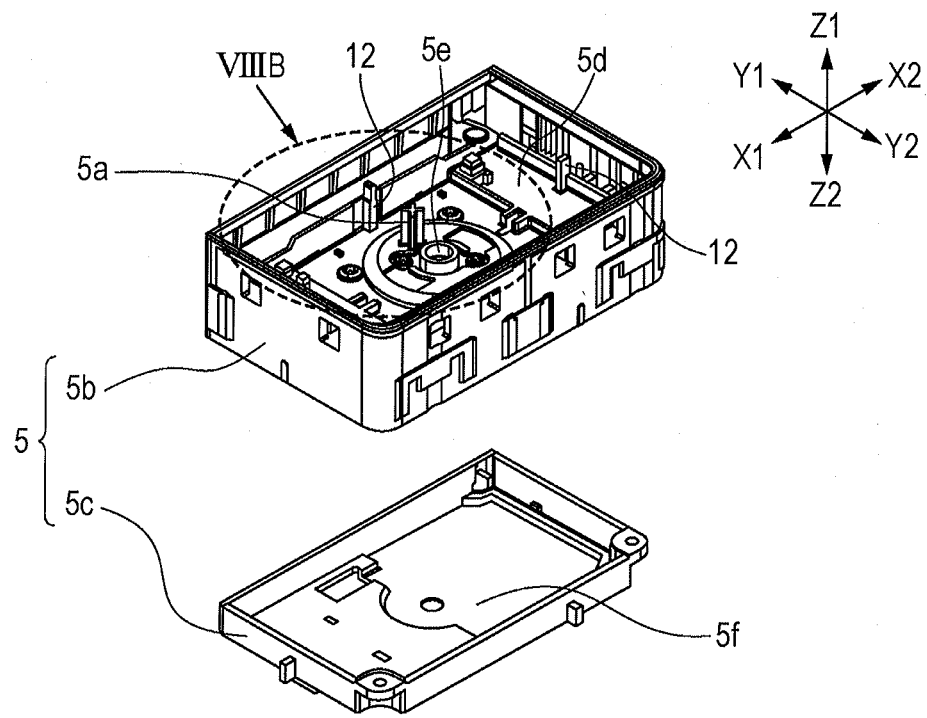
FIGS. 8A and 8B are diagrams showing a case member according to the first embodiment.
Figure 8B:
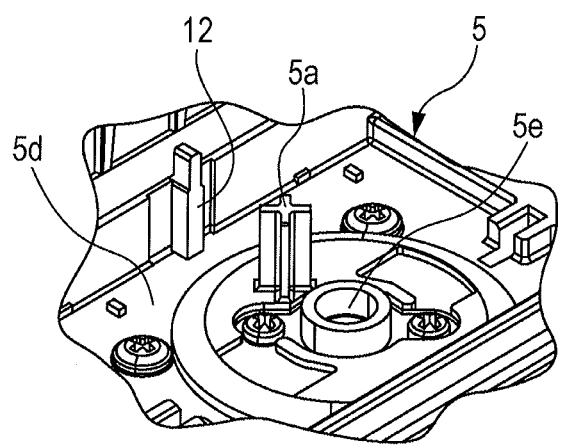

First, the configuration of the input device 100 according to the embodiment will be described with reference to FIGS. 1 to 9. FIG. 1 is an exploded perspective view showing the configuration of the input device 100 according to the first embodiment. FIG. 2 is a perspective view showing the appearance of the input device 100 according to the first embodiment. FIG. 3 is a perspective view showing the appearance of a pressing detection portion 10 according to the first embodiment. FIGS. 4A to 4C are diagrams showing an operation portion 1 according to the first embodiment, FIG. 4A is a perspective view showing the appearance of the operation portion 1, FIG. 4B is a plan view of the operation portion 1 as seen from a Z2 direction side shown in FIG. 4A, and FIG. 4C is a side view of the operation portion 1 as seen from a Y2 direction side shown in FIG. 4A. FIGS. 5A and 5B are diagrams showing a driving member 3 according to the first embodiment, FIG. 5A is a perspective view showing the appearance of the driving member 3, and FIG. 5B is an exploded perspective view showing the configuration of the driving member 3. FIG. 6 is a perspective view showing the appearance of a restricting member 7 according to the first embodiment. FIGS. 7A and 7B are diagrams showing an interlocking member 6 according to the first embodiment, FIG. 7A is a perspective view showing the appearance of the interlocking member 6, and FIG. 7B is a perspective view of the interlocking member 6 as seen from a Z2 direction side shown in FIG. 7A. FIGS. 8A and 8B are diagrams showing a case member 5 according to the first embodiment, FIG. 8A is an exploded perspective view showing the configuration of the case member 5, and FIG. 8B is an enlarged view of a portion VIIIB shown in FIG. 8A. FIG. 9 is a plan view showing a state where rotation prevention members 12 and rotation prevention guide portions 1b of the operation portion 1 according to the first embodiment are engaged with each other.

As shown in FIG. 1, the input device 100 includes the operation portion 1, an input detection portion 2, the driving member 3, elastic members 4, the case member 5, the interlocking member 6, the restricting member 7, first damper members 8, second damper members 9, the pressing detection portion 10, a substrate 11, and the rotation prevention members 12. As shown in FIG. 2, the input device 100 is formed in a substantially rectangular parallelepiped shape, the operation portion 1 is provided at an upper surface thereof, and it is possible to perform an input, for example, by contacting with or pressing the operation portion 1 with an operating body OB (e.g., a finger of a person).

Each first damper member 8 preferably has elasticity and is made of a rubber sheet formed in a rectangular shape as shown in FIG. 1. It should be noted that four first damper members 8 are used in the embodiment.

Each second damper member 9 has elasticity and is made of a rubber sheet formed in a rectangular shape as shown in FIG. 1. It should be noted that four second damper members 9 are used in the embodiment.

Each elastic member 4 is made of a metal wire and formed in a coil spring shape as shown in FIG. 1. It should be noted that four elastic members 4 are used in the embodiment.

The substrate 11 is made of a rigid substrate such as a glass epoxy substrate and formed in a substantially rectangular plate shape as shown in FIG. 1, and circuits are formed on both surfaces thereof.

The input detection portion 2 is a component called a capacitance type touch panel or touchpad and is formed in a substantially rectangular plate shape having substantially the same size as the substrate 11 as shown in FIG. 1. The input detection portion 2 has, in an upper surface (a surface at a Z1 direction side) thereof, an input surface 2a in which a change in capacitance due to the operating body OB contacting with or coming close to the input surface 2a is captured to detect an input operation. The input surface 2a is formed as a smooth flat surface.

As shown in FIG. 3, the pressing detection portion 10 is composed of a push switch 10b including an operation button 10a capable of being press-operated, and the operation button 10a is capable of being press-operated in a Z1 direction. When the operation button 10a is press-operated, an electrical connection in an electrical circuit formed within the pressing detection portion 10 is switched, whereby it is detected that the operation button 10a is pressed. It should be noted that when the pressing operation is stopped, the operation button 10a returns to a position that is the position prior to the operation, and the electrical connection in the electrical circuit also returns to a state that is the state prior to the operation.

The operation portion 1 is made of a synthetic resin material and formed in a rectangular plate shape as shown in FIG. 4. It should be noted that in the embodiment, the operation portion 1 includes a tray portion 1e formed in a plate shape and a cover portion 1f covering the tray portion 1e. When the cover portion 1f is overlaid on the tray portion 1e, a space 1 is formed in which it is possible to accommodate the input detection portion 2 and the substrate 11 having the pressing detection portion 10 and the like mounted therein. The upper surface of the operation portion 1 is formed as a smooth flat surface, and an operation surface 1c to be operated by the operating body OB is formed therein. In addition, the operation portion 1 preferably includes a connection portion 1a provided so as to extend downward from a center of the lower surface thereof. The connection portion 1a is formed in a cylindrical shape, a cylindrical surface thereof is cut out at a Y1-Y2 direction side thereof, and thus the connection portion 1a is divided into an X1 direction side and an X2 direction side. The operation portion 1 includes, at a tip of the connection portion 1a formed at the X1 direction side, a plate-shaped hook portion 1d projecting in the X1 direction, and includes, at a tip of the connection portion 1a formed at the X2 direction side, another plate-shaped hook portion 1d projecting in the X2 direction. In addition, the operation portion 1 has a center hole 1h extending through a center portion of the lower surface thereof to the space 1g. The center hole 1h is formed so as to extend in the Y1 direction from the interior of the cylinder of the connection portion 1a and the cutout portion of the cylindrical surface at the Y1 direction side. Moreover, the operation portion 1 includes, in each side surface thereof, the rotation prevention guide portion 1b formed in a cutout shape. The rotation prevention guide portion 1b extends through a center of the operation portion 1 in a plan view and is formed at a position where a straight line LN that divides the operation portion 1 into substantially two equal sections intersects the side surface. It should be noted that in the embodiment, the rotation prevention guide portion 1b is formed in each side surface of the tray portion 1e and covered with the cover portion 1f such that only the cutout at the lower surface side is exposed.

As shown in FIGS. 5A and 5B, the driving member 3 is a solenoid actuator 3c preferably including a columnar plunger 3a, which is drivable along the up-down direction (Z1-Z2 direction). The solenoid actuator 3c includes a guide member 3b disposed at an upper side thereof so as to surround the plunger 3a. The solenoid actuator 3c (driving member 3) is capable of driving the plunger 3a in the up-down direction by an electromagnetic force which is generated by applying a current thereto.

The restricting member 7 is made of a metal plate and formed in a rectangular plate shape in a plan view as shown in FIG. 6. The restricting member 7 includes a main body portion 7c formed in a rectangular plate shape, and the main body portion 7c preferably has a circular first opening 7b at a center thereof. In addition, the restricting member 7 includes a plurality of leg portions 7a provided so as to extend downward. In the embodiment, the leg portions 7a are provided so as to extend in the X1-X2 direction and downward from the four corners of the main body portion 7c, respectively.

The interlocking member 6 is made of a synthetic resin material and formed in a plate shape as shown in FIGS. 7A and 7B. The interlocking member 6 includes a base portion 6b formed in a plate shape, and preferably has, at a center of the base portion 6b, a second opening 6a having a smaller diameter than the first opening 7b. In addition, the diameter of the second opening 6a is larger than the diameter of the connection portion 1a of the operation portion 1 and smaller than the distance between tips of the hook portions 1d. Moreover, the interlocking member 6 includes elastic member arrangement portions 6c formed in a recess shape such that it is possible to arrange the elastic members 4 therein, at outer peripheral end portions of the base portion 6b opposed to each other across the second opening 6a, at outer peripheral ends at both sides in the X1-X2 direction in the embodiment. Two elastic member arrangement portions 6c are provided at each of the X1 direction side and the X2 direction side.

The case member 5 is made of a synthetic resin material and formed in a rectangular parallelepiped shape as shown in FIG. 2. As shown in FIGS. 8A and 8B, the case member 5 includes an upper case member 5b and a lower case member 5c and is formed by overlaying the upper case member 5b on the lower case member 5c. The upper case member 5b includes an accommodation portion 5d formed on an upper surface thereof and having a rectangular recess shape in a plan view. A through hole 5e is formed in a center portion of the accommodation portion 5d so as to extend therethrough in the up-down direction. It should be noted that the through hole 5e is formed so as to have such a size that it is possible to insert the plunger 3a and the guide member 3b of the driving member 3 therethrough. In addition, the case member 5 includes a pressing portion 5a formed so as to extend upward. The pressing portion 5a is formed so as to be slightly spaced apart from the through hole 5e in the Y1 direction. The lower case member 5c is formed in a hollow shape opened upward, and includes an arrangement portion 5f formed therein in which it is possible arrange the driving member 3. It should be noted that when the upper case member 5b is overlaid on the lower case member 5c to form the case member 5, the arrangement portion 5f is connected to the accommodation portion 5d via the through hole 5e.

Each rotation prevention member 12 is made of a synthetic resin material and formed in a bar shape. It should be noted that in the embodiment, as shown in FIGS. 8A, 8B, and 9, each rotation prevention member 12 is formed so as to be integrated with the case member 5. Each rotation prevention member 12 is formed in the accommodation portion 5d of the case member 5 so as to project upward and so as to have such a shape that the rotation prevention member 12 is engageable with the rotation prevention guide portion 1b, and is arranged at such a position that the rotation prevention member 12 is engageable with the rotation prevention guide portion 1b. It should be noted that the rotation prevention members 12 are formed at positions where a straight line which divides the accommodation portion 5d into two equal sections in the X1-X2 direction when the accommodation portion 5d of the case member 5 is seen in a plan view and a straight line which divides the accommodation portion 5d into two equal sections in the Y1-Y2 direction when the accommodation portion 5d of the case member 5 is seen in a plan view intersect the sides of the accommodation portion 5d.

Figure 10A:
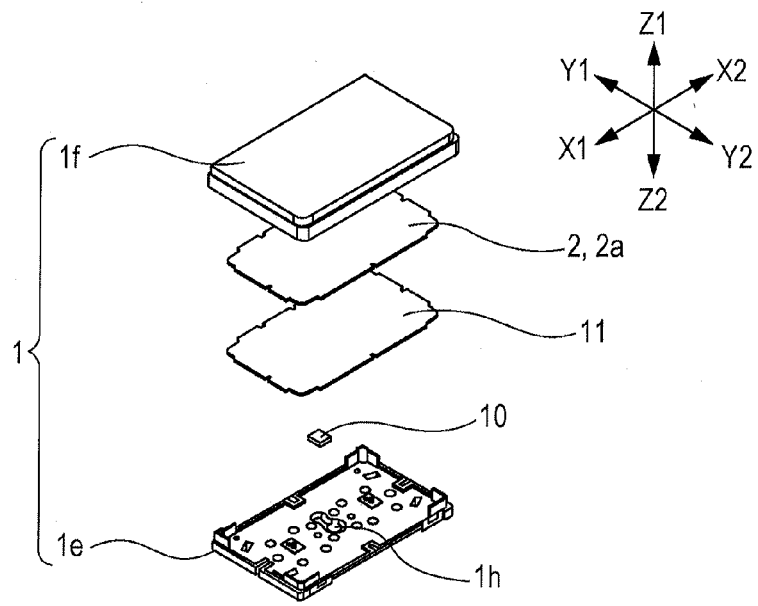
FIGS. 10A and 10B are diagrams showing arrangement of the operation portion, a substrate, an input detection portion, and the pressing detection portion according to the first embodiment.
Figure 10B:
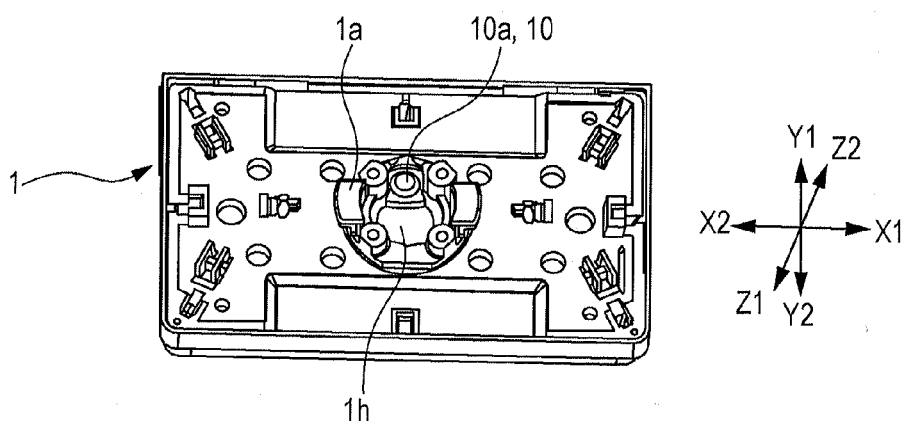
Figure 11:
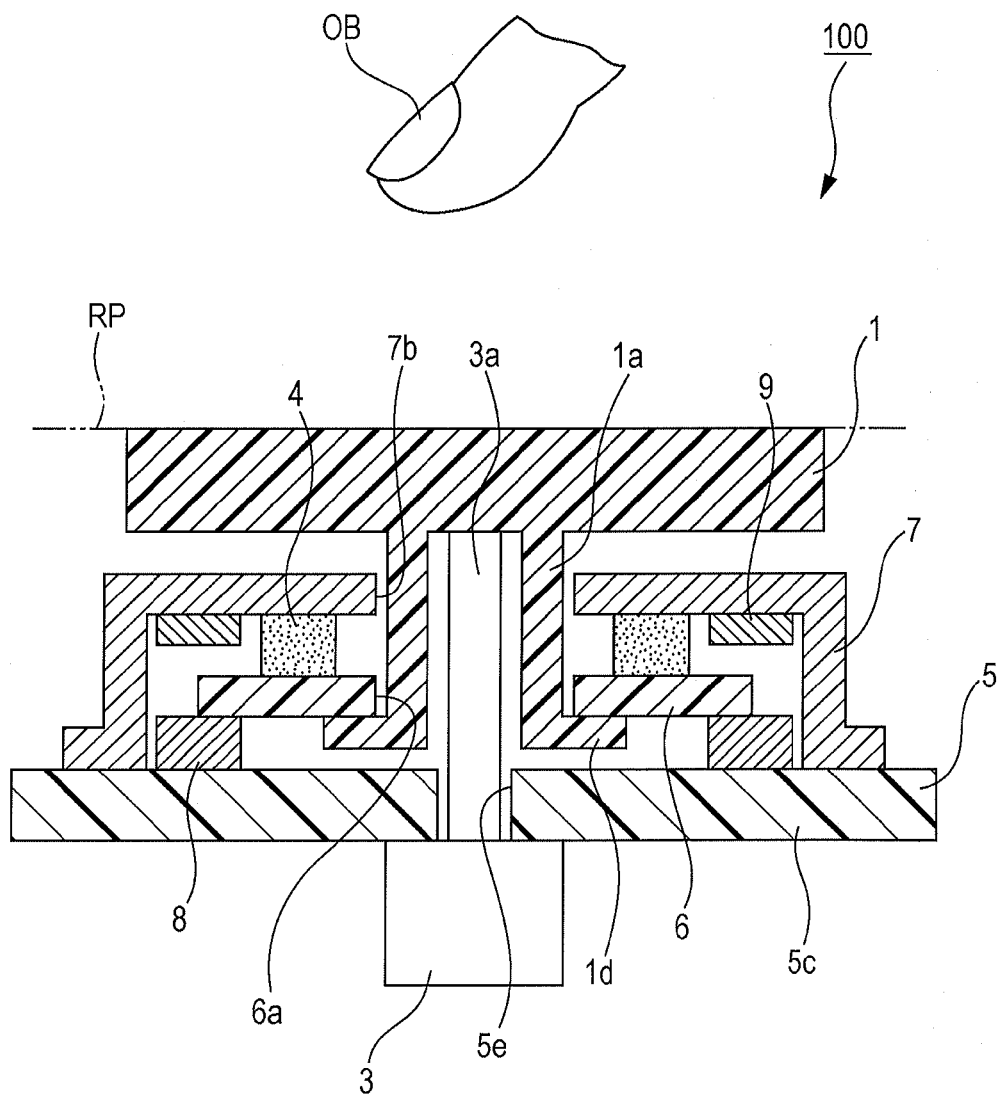
FIG. 11 is a schematic cross-sectional view showing the structure of the input device according to the first embodiment.
Figure 12:
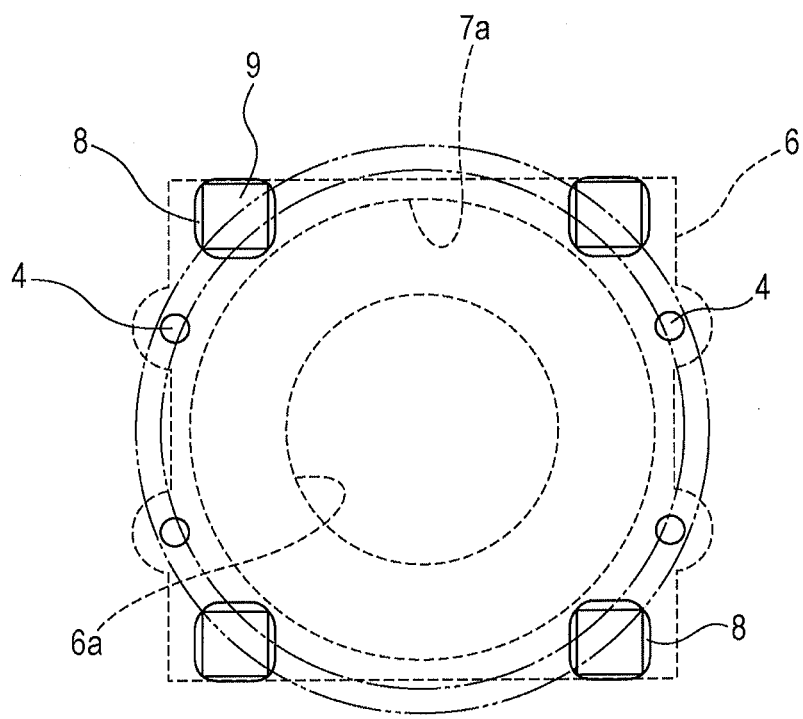
FIG. 12 is a schematic cross-sectional view showing a positional relation when elastic members, first damper members, and second damper members according to the first embodiment are seen in a plan view.
Figure 13:
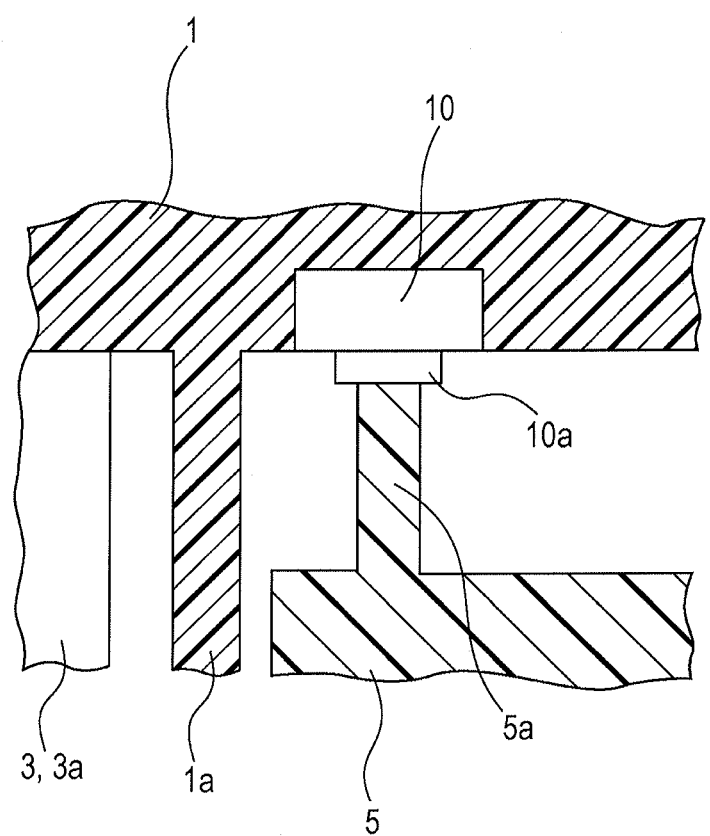
FIG. 13 is a schematic diagram showing a positional relation among a pressing portion, the pressing detection portion, and a plunger according to the first embodiment.

The structure of the input device 100 will be described next with reference to FIGS. 1 and 9 to 13. FIGS. 10A and 10B are diagrams showing arrangement of the operation portion 1, the substrate 11, the input detection portion 2, and the pressing detection portion 10 according to the first embodiment, FIG. 10A is an exploded perspective view showing the arrangement of the operation portion 1, the substrate 11, the input detection portion 2, and the pressing detection portion 10, and FIG. 10B is a perspective view showing a state where the operation button 10a is exposed from the center hole 1h. FIG. 11 is a schematic cross-sectional view showing the structure of the input device 100 according to the first embodiment. It should be noted that the structure of some portion in FIG. 11 is different from the actual one. FIG. 12 is a schematic plan view showing a positional relation when the elastic members 4, the first damper members 8, and the second damper members 9 according to the first embodiment are seen in a plan view. FIG. 13 is a schematic diagram showing a positional relation among the pressing portion 5a, the pressing detection portion 10, and the plunger 3a according to the first embodiment.

As shown in FIG. 1, the one elastic member 4 is arranged in each of the four elastic member arrangement portions 6c provided in the interlocking member 6. In addition, a plurality of the second damper members 9 are preferably provided on the lower surface of the restricting member 7 along a circumference concentric with the first opening 7b and having a larger diameter than the first opening 7b. In the embodiment, the one second damper member 9 is locked near the base of each leg portion 7a.

In addition, as shown in FIGS. 10A and 10B, the input detection portion 2 is overlaid on the upper surface of the substrate 11 such that the input surface 2a is located so as not to be opposed to the substrate 11. Moreover, the pressing detection portion 10 is provided on the lower surface of the substrate 11 such that the operation button 10a faces downward. The substrate 11 on which the input detection portion 2 and the pressing detection portion 10 are arranged is arranged on the lower surface of the operation portion 1 as described above. In the embodiment, the substrate 11 is arranged on the lower surface of the cover portion 1f, and the tray portion 1e is arranged on the lower surface of the substrate 11. In other words, the input surface 2a of the input detection portion 2 is located within the space 1g of the operation portion 1 so as to be opposed to the cover portion 1f. It should be noted that the operation button 10a of the pressing detection portion 10 is exposed downward from the center hole 1h as shown in FIG. 10B and thus is capable of being operated from below.

In addition, as shown in FIG. 11, the interlocking member 6 is provided below the operation portion 1, and the restricting member 7 is provided between the operation portion 1 and the interlocking member 6. The interlocking member 6 arranged as described above is connected to the operation portion 1 on which the restricting member 7 is inserted. In other words, the connection portion 1a of the operation portion 1 is preferably inserted into the first opening 7b of the restricting member 7 and inserted into the second opening 6a of the interlocking member 6, and the hook portion 1d is engaged with the second opening 6a, whereby the operation portion 1 and the interlocking member 6 are connected to each other. It should be noted that the interlocking member 6 is connected so as to be movable in the up-down direction along the connection portion 1a. Since the operation portion 1, the interlocking member 6, and the restricting member 7 are arranged as described above, the elastic members 4 are provided below the operation portion 1, and the second damper members 9 are arranged on a surface of the restricting member 7, which is opposed to the interlocking member 6.

In addition, the driving member 3 is arranged at the arrangement portion 5f of the lower case member 5c (see FIG. 8A) and the upper case member 5b (see FIG. 8A) is overlaid on the lower case member 5c so as to be engaged with the lower case member 5c, whereby the case member 5 holds the driving member 3. The plunger 3a of the driving member 3 held by the case member 5 projects through the through hole 5e. Thus, the plunger 3a is located near the pressing portion 5a (see FIGS. 8A and 8B) and projects upward parallel to the pressing portion 5a. In addition, the four first damper members 8 are arranged at equal intervals so as to surround the through hole 5e.

Next, the operation portion 1, the interlocking member 6, and the restricting member 7, which are integrated with each other, are arranged in the accommodation portion 5d of the case member 5 such that the operation portion 1 is exposed in the upper surface of the case member 5, and the restricting member 7 is attached to the case member 5 via the leg portions 7a so as to cover the interlocking member 6. Thus, the operation portion 1, the interlocking member 6, and the restricting member 7, which are integrated with each other, are locked by the case member 5, and the first damper members 8 are provided below the interlocking member 6 so as to be contactable with the interlocking member 6. It should be noted that since the restricting member 7 is locked by the case member 5, the elastic members 4 are held between the interlocking member 6 and the restricting member 7 and urge the interlocking member 6 downward such that the interlocking member 6 contacts with the first damper members 8. In addition, since the elastic members 4 urge the interlocking member 6 downward, the operation portion 1, which contacts with the interlocking member 6 at the hook portion 1d, is elastically urged so as to be brought into press contact with the plunger 3a. Thus, the operation portion 1 is supported so as to be movable downward from a reference position RP in accordance with pressing by the operating body OB. Moreover, the elastic members 4, the first damper members 8, and the second damper members 9, which are arranged as described above, are located so as to be concentric with respect to the center of the flat plate-shaped interlocking member 6 as shown in FIG. 12; a plurality of the elastic members 4, a plurality of the first damper members 8, and a plurality of the second damper members 9 are preferably arranged outside the first opening 7b; and the four elastic members 4, the four first damper members 8, and the four second damper members 9 are arranged outside the first opening 7b in the embodiment. Also, as shown in FIG. 9, the rotation prevention guide portions 1b and the rotation prevention members 12 are slidably engaged with each other. Furthermore, the driving member 3 is provided below the operation portion 1 as shown in FIG. 11 and located at the center of the operation portion 1 in a plan view, and the plunger 3a is preferably inserted into the second opening 6a and the first opening 7b and arranged such that the upper end portion thereof contacts with the lower surface of the operation portion 1. Moreover, as shown in FIG. 13, the pressing portion 5a and the pressing detection portion 10 are arranged near the plunger 3a, and the pressing portion 5a is opposed to the pressing detection portion 10 so as to be able to press the operation button 10a. In this manner, the input device 100 is formed.

Figure 14:
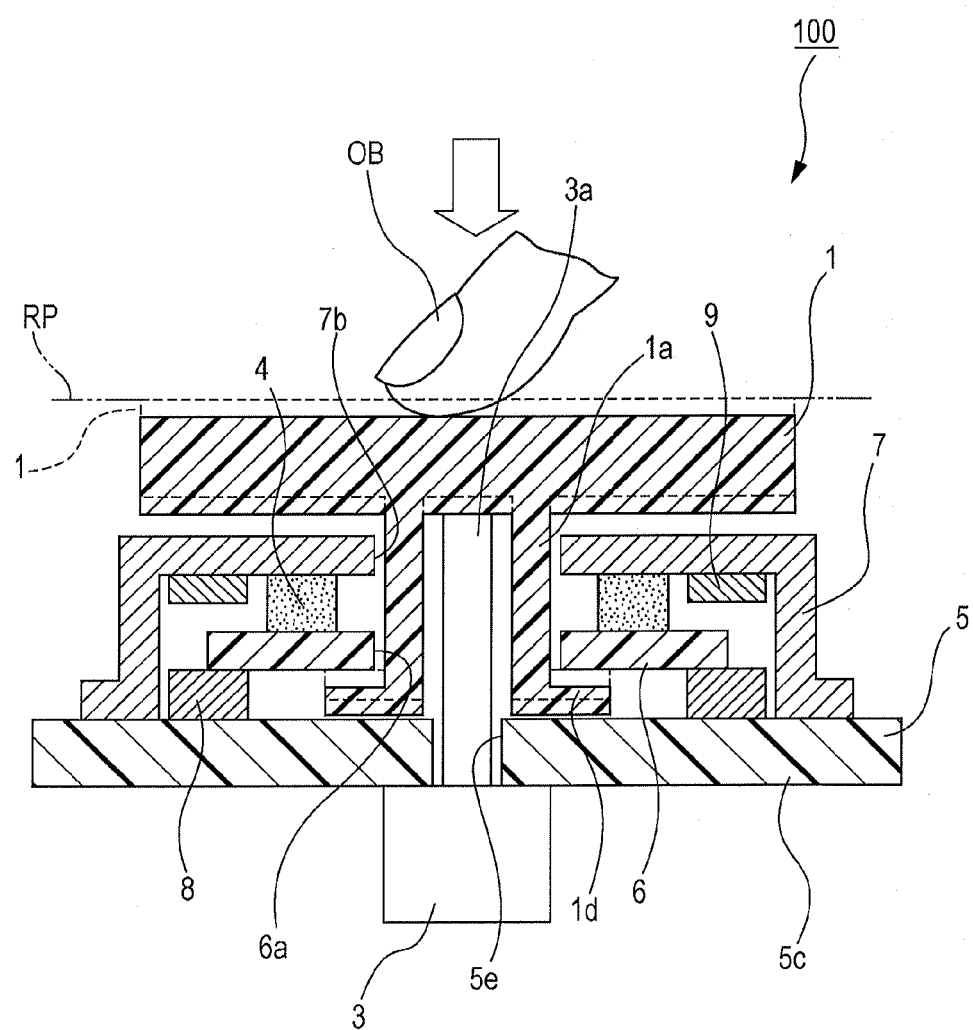
FIG. 14 is a schematic diagram showing a movement of the operation portion when the operation portion according to the first embodiment is press-operated.
Figure 15:
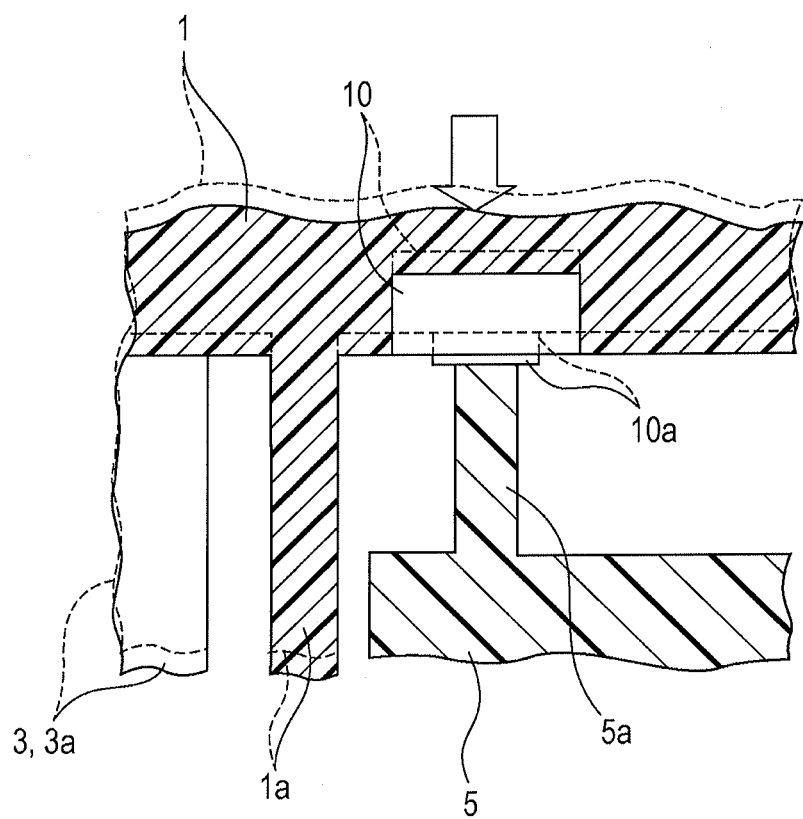
FIG. 15 is a schematic diagram showing a positional relation among the pressing detection, the pressing detection portion, and the plunger when the pressing detection according to the first embodiment is press-operated.

A movement of the input device 100 will be described next with reference to FIGS. 11 and 13 to 15. FIG. 14 is a schematic diagram showing a movement of the operation portion 1 when the operation portion 1 according to the first embodiment is press-operated. FIG. 15 is a schematic diagram showing a positional relation among the pressing portion 5a, the pressing detection portion 10, and the plunger 3a when the pressing portion 5a according to the first embodiment is press-operated.

The input device 100 allows an input operation to be performed by the operating body OB such as a finger of a person contacting with or coming close to the upper surface of the operation portion 1 and allows an input operation to be performed by pressing the operation portion 1 with the operating body OB. First, an input operation by the operating body OB contacting with or coming close to the upper surface of the operation portion 1 will be described. In the input device 100, the input detection portion 2, which is a capacitance type touch panel, is arranged in the interior (space 1g) of the operation portion 1 such that the input surface 2a, which is capable of detecting a change in capacitance, faces upward. Since the capacitance changes by the operating body OB contacting with or coming close to the upper surface of the operation portion 1, it is possible to determine that an input operation has been performed, by detecting the change in capacitance, whereby it is possible to detect the input operation with respect to the operation portion 1.

A movement made when an input operation is performed by pressing the operation portion 1 will be described next. When the operation portion 1 is not press-operated, the operation portion 1 is located at the height of the reference position RP as shown in FIG. 11, and the pressing detection portion 10 is not pressed as shown in FIG. 13.

When the operation portion 1 is press-operated downward, the hook portion 1d and the interlocking member 6 come out of contact with each other and the operation portion 1 moves downward from the reference position RP as shown in FIG. 14. It should be noted that the plunger 3a is pressed downward by the operation portion 1 with the downward movement of the operation portion 1 while being guided by the guide member 3b. In other words, the operation portion 1 is guided in the up-down direction by the guide member 3b of the plunger 3a. Since the operation portion 1 moves downward as described above, the operation button 10a of the pressing detection portion 10, which is opposed to the pressing portion 5a, is pressed by the pressing portion 5a as shown in FIG. 15, the electrical connection in the electrical circuit formed within the pressing detection portion 10 is switched and the downward movement of the operation portion 1 from the reference position RP is detected. In other words, the pressing detection portion 10 detects that the operation portion 1 is press-operated. In addition, when the pressing of the operation portion 1 is released, the operation portion 1 returns to a state that is the state prior to the press operation shown in FIG. 11.

Figure 16:
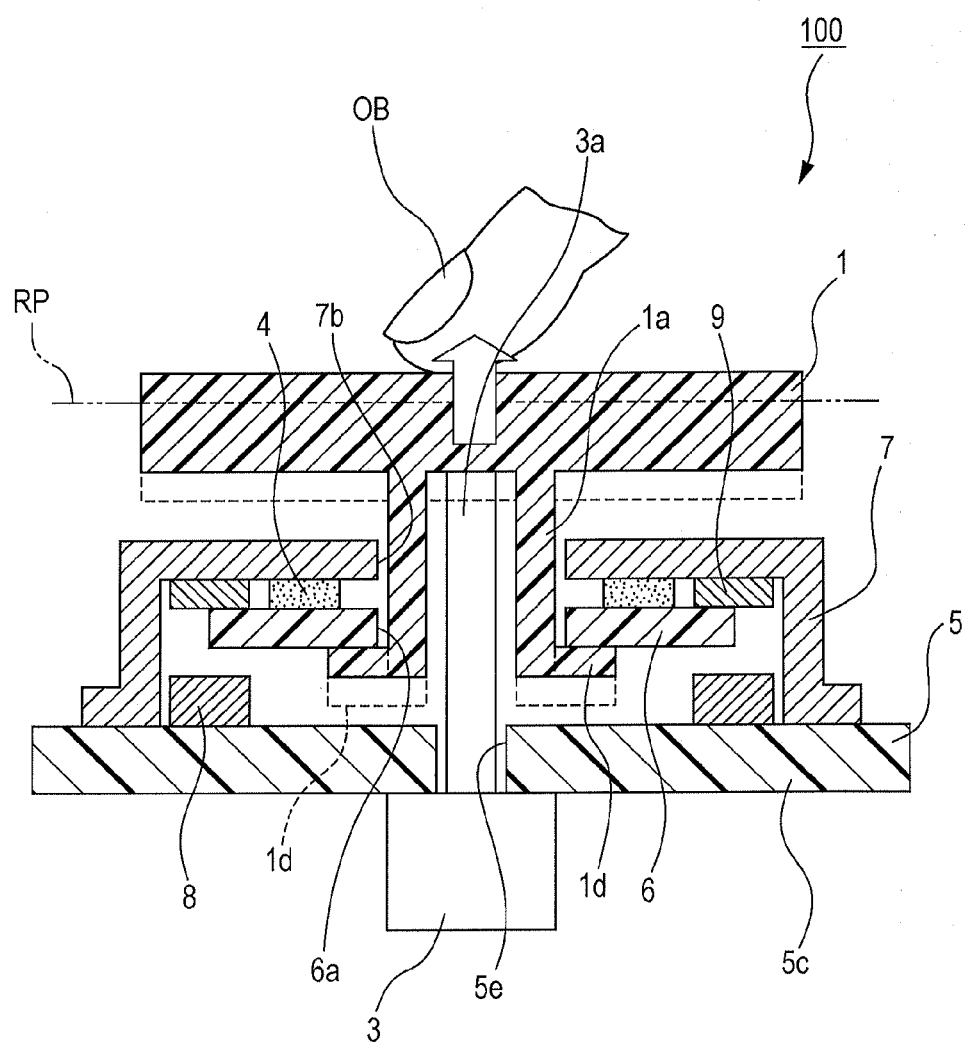
FIG. 16 is a schematic diagram showing a movement of the operation portion when the operation portion according to the first embodiment is driven upward by the driving member.
Figure 17:
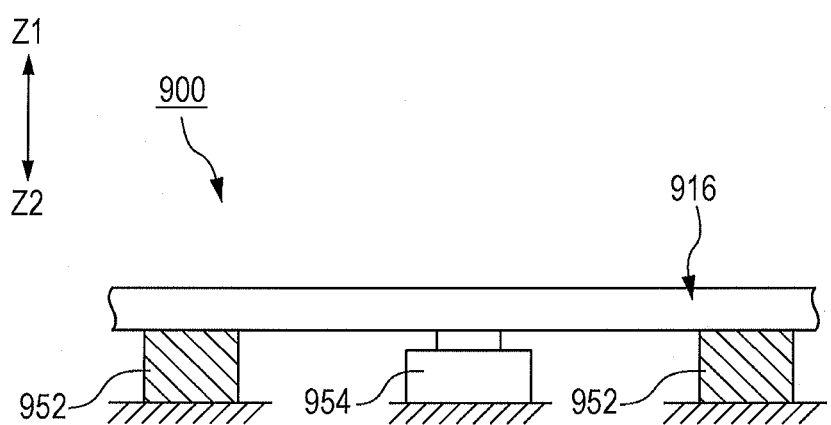
FIG. 17 is a side view showing the configuration of an input device described in PCT Japanese Translation Patent Publication No. 2008-516348.

A movement that provides an operation feeling to the operator will be described next with reference to FIGS. 11 and 16. FIG. 16 is a schematic diagram showing a movement of the operation portion 1 when the operation portion 1 according to the first embodiment is driven upward by the driving member 3. The input device 100 is set such that when the operation portion 1 is press-operated, vibration is applied to the operation portion 1 by the driving member 3, thereby providing an operation feeling to the operator. When the pressing detection portion 10 detects that the operation portion 1 is press-operated, a current is applied to the driving member 3. When the current is applied to the solenoid actuator 3c (driving member 3), an electromagnetic force occurs and the plunger 3a is driven in the up-down direction while being guided by the guide member 3b. By the plunger 3a being driven in the up-down direction as described above, the driving member 3 drives the operation portion 1 in the up-down direction to apply vibration thereto, thereby providing an operation feeling to the operator. When the plunger 3a moves upward, the operation portion 1 is pressed upward as shown in FIG. 16, and the interlocking member 6 is driven upward with the operation portion 1. At that time, the elastic members 4 are pressed in such a direction as to resist the urging force, and thus compressed. The interlocking member 6 that has been driven upward with the operation portion 1 collides against the second damper members 9. The interlocking member 6 that has collided against the second damper members 9 is preferably restricted from moving upward by the restricting member 7 via the second damper members 9, and the upward movement thereof is stopped. When the plunger 3a moves downward, the interlocking member 6 whose upward movement has been stopped is snapped downward by the urging forces of the elastic members 4 which elastically urge the interlocking member 6 such that the interlocking member 6 is brought into press contact with the first damper members 8 and the urging forces of the second damper members 9 that have been compressed by the collision of the interlocking member 6, and is driven downward with the operation portion 1, as shown in FIG. 11. The interlocking member 6 that has been driven downward with the operation portion 1 collides against the first damper members 8 and the downward movement thereof is stopped. In addition, the operation portion 1 stops moving downward by contacting with the plunger 3a. By the plunger 3a repeating upward movement and downward movement as described above, the input device 100 provides vibration as an operation feeling to the operator via the operation portion 1.

Advantages of the embodiment will be described below.

The input device 100 according to the embodiment is an input device including the operation portion 1 allowing an input operation to be performed by the operating body OB contacting with or coming close to the upper surface thereof; the input detection portion 2 detecting an input operation with respect to the operation portion 1; the driving member 3 provided below the operation portion 1 and driving the operation portion 1 in the up-down direction; the elastic members 4 provided below the operation portion 1; the case member 5 holding the driving member 3; the interlocking member 6 provided below the operation portion 1, connected to the operation portion 1, and driven with the operation portion 1; the restricting member 7 provided between the operation portion 1 and the interlocking member 6 and restricting upward movement of the interlocking member 6; and the first damper members 8 provided below the interlocking member 6, contactable with the interlocking member 6, and having elasticity. The elastic members 4 elastically urge the interlocking member 6 such that the interlocking member 6 is brought into press contact with the first damper members 8.

Thus, since upward movement of the interlocking member 6 which is driven in synchronization with the operation portion 1 which moves up and down by movement of the driving member 3 is restricted by the restricting member 7 in the middle of upward movement of the interlocking member 6, the upward movement of the interlocking member 6 is forcibly stopped and reversed to downward movement thereof. In addition, since the elastic members 4 are arranged between the restricting member 7 and the interlocking member 6, it is possible to increase the speed of downward movement of the interlocking member 6 by the urging forces of the elastic members 4. Thus, the operation portion 1 is immediately reversed to downward movement, and hence it is possible to generate vibration, which is easily and clearly felt by the operator. Moreover, since the first damper members 8 are provided below the interlocking member 6 and the elastic members 4 are configured to elastically urge the interlocking member 6 such that the interlocking member 6 is brought into press contact with the first damper members 8, after movement of the driving member 3 is stopped, it is possible to terminate vibration remaining in the operation portion 1 and the interlocking member 6. Therefore, it is possible to provide an input device capable of generating a sharp operation feeling.

In addition, in the input device 100 according to the embodiment, preferably, the interlocking member 6 is formed in a flat plate shape, the restricting member 7 preferably includes the plurality of leg portions 7a formed in a flat plate shape and provided so as to extend downward and is attached to the case member 5 via the leg portions 7a so as to cover the interlocking member 6, and a plurality of the elastic members 4 and a plurality of the first damper members 8 are arranged at positions concentric with respect to the center of the flat plate-shaped interlocking member 6 in a plan view.

Thus, since the interlocking member 6 and the restricting member 7 are formed in a flat plate shape and the restricting member 7 is arranged so as to cover the interlocking member 6, when the interlocking member 6 moves up and down, the interlocking member 6 and the restricting member 7 collide against each other at their surfaces, and it is made possible for the interlocking member 6 and the restricting member 7 to assuredly collide against each other. In addition, since the interlocking member 6 is formed in a flat plate shape and a plurality of the elastic members 4 and a plurality of the contact members are arranged so as to be concentric with respect to the center of the flat plate, the urging forces by the elastic members 4 are made uniform and the contact with the first damper members 8 is uniformly made, and thus it is possible to further efficiently terminate vibration. Therefore, it is possible to provide an input device capable of generating a further sharp operation feeling.

In addition, in the input device 100 according to the embodiment, the restricting member 7, which is formed in a flat plate shape in a plan view, has the first opening 7b at the center thereof, the operation portion 1 includes the connection portion 1a provided so as to extend downward, the connection portion 1a is inserted into the first opening 7b and connected to the interlocking member 6, and the elastic members 4 and the first damper members 8 are arranged outside the first opening 7b in a plan view.

Thus, since the connection portion 1*a* is provided to the operation portion 1, the first opening 7*b* having a smaller diameter than circles formed by connecting the elastic members 4 and the first damper members 8, which are concentrically arranged, by virtual lines is provided in the restricting member 7, and the operation portion 1 and the restricting member 7 are connected to each other by the connection portion 1*a* inserted into the first opening 7*b*, it is possible to efficiently arrange the constituent components. Thus, it is possible to reduce the size of a switch device.

In addition, the input device 100 according to the embodiment includes the second damper members 9 having elasticity, a plurality of the second damper members 9 are provided on the surface of the restricting member 7 which is opposed to the interlocking member 6 and along a circumference concentric with the first opening 7*b* and having a lager diameter than the first opening 7*b*, and movement of the interlocking member 6 is restricted by the restricting member 7 via the second damper members 9.

Thus, since the second damper members 9 are provided on the surface of the restricting member 7, which is opposed to the interlocking member 6, it is possible to absorb collision sound generated when the restricting member 7 restricts movement of the interlocking member 6. In addition, since a plurality of the second damper members 9 are concentrically arranged, contact thereof is uniformly made, and it is possible to further efficiently absorb the collision sound. Therefore, it is possible to provide an input device generating small operation sound. Moreover, in the embodiment, the four second damper members 9 are arranged concentrically at equal central angles. Thus, as compared to the case where two or three second damper members 9 are concentrically arranged, the colliding interlocking member 6 is unlikely to tilt in any direction, and it is possible to efficiently absorb the collision sound without arranging an excessive number of the second damper members 9. Furthermore, in the embodiment, since the first damper members 8 having elasticity are arranged below the interlocking member 6, it is possible to absorb collision sound at the lower side.

In addition, in the input device 100 according to the embodiment, the driving member 3 includes the columnar plunger 3*a* movable in the up-down direction, the interlocking member 6 has, at the center thereof, the second opening 6*a* having a smaller diameter than the first opening 7*b*, and the plunger 3*a* is inserted into the second opening 6*a* and the first opening 7*b* and brought into contact with the operation portion 1.

Thus, since the plunger 3*a* is provided to the driving member 3, the second opening 6*a* is provided in the interlocking member 6, and the driving member 3 is inserted into the first opening 7*b* and the second opening 6*a* and brought into contact with the operation portion 1, the driving member 3 is able to efficiently transmit vibration directly to the operation portion 1. Therefore, it is possible to provide an input device capable of generating a further sharp operation feeling. In addition, since the driving member 3 is inserted into the first opening 7*b* and the second opening 6*a* and brought into contact with the operation portion 1, it is not necessary to provide a drive mechanism so as to avoid the other constituent components, and thus it is possible to simplify the structure in which the driving member 3 drives the operation portion 1. Moreover, it is possible to use the plunger 3*a* as a guide for driving of the operation portion 1 in the up-down direction.

Although the input device according to the embodiment of the present invention has been specifically described above, the present invention is not limited to the above-described embodiment, and various modifications may be made without departing from the gist of the present invention, to implement the present invention. For example, the following modifications may be made to implement the present invention, and these embodiments also belong to the technical scope of the present invention.

Modification 1

In the first embodiment, the input device 100 is set such that when the operation portion 1 is press-operated, vibration is applied to the operation portion 1 by the driving member 3, thereby providing an operation feeling to the operator. However, the input device 100 may be set such that an operation feeling is provided to the operator also when an input operation is performed by bringing the operating body OB into contact with the operation portion 1.

Modification 2

In the first embodiment, the restricting member 7 is attached to the case member 5 via the leg portions 7*a* provided so as to extend downward. However, for example, the leg portions 7*a* may not be provided so as to extend downward and may be provided on the same plane on which the main body portion 7*c* is provided, projections corresponding to the leg portions 7*a* may be provided to the case member 5, and the restricting member 7 may be attached to the projections. In this case, it is possible to obtain the same advantages as those of the first embodiment.

Modification 3

In the first embodiment, the pressing detection portion 10 includes the operation button 10*a* and is composed of the push switch 10*b* in which the electrical connection in the electrical circuit formed therein is switched. However, the pressing detection portion 10 may be, for example, a type of push switch having a magnetoresistive element or the like included therein.

Modification 4

In the first embodiment, the driving member 3 drives the plunger 3*a* in the up-down direction with the solenoid actuator 3*c*. However, the driving member 3 may be configured to drive a bar-shaped constituent component in the up-down direction like the plunger 3*a* with a structure that is not the solenoid actuator 3*c*.

What is claimed is:
1. An input device comprising:
an operation portion that allows an input operation to be performed by an operating body contacting with or coming close to an upper surface thereof;
an input detection portion that detects an input operation with respect to the operation portion;
a driving member provided below the operation portion that drives the operation portion in an up-down direction;
an elastic member provided below the operation portion;
a case member that holds the driving member;
an interlocking member provided below the operation portion, connected to the operation portion, and driven with the operation portion;
a restricting member provided between the operation portion and the interlocking member that restricts upward movement of the interlocking member; and a first damper member provided below the interlocking member, contactable with the interlocking member, and having elasticity, wherein:

the elastic member elastically urges the interlocking member such that the interlocking member is brought into press contact with the first damper member, the restricting member has a flat plate shape in a plan view and has a first opening at a center thereof, the operation portion includes a connection portion provided so as to extend downward, the connection portion is inserted into the first opening and connected to the interlocking member, and the elastic member and the first damper member are arranged outside the first opening in a plan view.

2. The input device according to claim 1, wherein the interlocking member has a flat plate shape, the restricting member includes a plurality of leg portions formed in a flat plate shape and provided so as to extend downward, and is attached to the case member via the leg portions so as to cover the interlocking member, and a plurality of the elastic members and a plurality of the first damper members are arranged at positions concentric with respect to a center of the flat plate-shaped interlocking member in a plan view.

3. The input device according to claim 1, further comprising a second damper member having elasticity, wherein a plurality of the second damper members are provided on a surface of the restricting member which is opposed to the interlocking member and along a circumference concentric with the first opening and having a larger diameter than the first opening, and movement of the interlocking member is restricted by the restricting member via the plurality of second damper members.

4. The input device according to claim 1, wherein the driving member includes a columnar plunger movable in the up-down direction, the interlocking member has, at a center thereof, a second opening having a smaller diameter than the first opening, and the plunger is inserted into the second opening and the first opening and brought into contact with the operation portion.

* * * * *